United States Patent [19]

Gilson

[11] Patent Number: 4,537,866

[45] Date of Patent: Aug. 27, 1985

[54] METHOD OF PREPARING SILICATE COMPOSITION

[75] Inventor: Jean-Pierre Gilson, Buffalo Grove, Ill.

[73] Assignee: UOP Inc., Des Plaines, Ill.

[21] Appl. No.: 594,590

[22] Filed: Mar. 29, 1984

[51] Int. Cl.$^3$ .......................... B01J 21/08; B01J 29/04
[52] U.S. Cl. ..................................... 502/70; 502/233; 502/235; 423/333
[58] Field of Search .................. 502/10, 70, 233, 243, 502/407; 423/333, 338

[56] References Cited

U.S. PATENT DOCUMENTS

| | | | |
|---|---|---|---|
| Re. 23,043 | 10/1948 | Wegst et al. | 423/333 |
| 2,384,946 | 9/1945 | Marisic | 252/448 |
| 2,385,217 | 9/1945 | Marisic | 252/448 |
| 2,525,135 | 10/1950 | Huff | 18/21 |
| 2,645,619 | 7/1953 | Hoekstra | 252/448 |
| 2,668,149 | 2/1954 | Iler | 252/313 |
| 2,672,452 | 3/1954 | Wankat | 252/448 |
| 2,834,739 | 5/1958 | Becker et al. | 252/448 |
| 3,165,379 | 1/1965 | Schwartz | 423/338 |
| 3,180,746 | 4/1965 | Patton et al. | 106/74 |
| 3,180,747 | 4/1965 | Patton et al. | 106/74 |
| 3,392,039 | 7/1968 | Cuneo, Jr. | 106/84 |
| 3,875,079 | 4/1975 | Witt | 502/243 X |

FOREIGN PATENT DOCUMENTS 1198313 7/1970 United Kingdom .
1263984 2/1972 United Kingdom .

OTHER PUBLICATIONS

"The Chemistry of SiO$_2$" by R. K. Iler, John Wiley & Sons, 1979.

*Primary Examiner*—Carl F. Dees
*Attorney, Agent, or Firm*—Thomas K. McBride; William H. Page, II

[57] ABSTRACT

A method of preparing a silica-containing composition from a lithium silicate sol is disclosed. The compositions are prepared by heating shaped particles of lithium silicate sol to a temperature of about 70° C. or more in the absence of a gelling agent and thereafter subjecting the particles to a washing step to remove lithium therefrom. By means of the novel method it is possible to prepare silica-containing compositions which are suitable as catalyst and/or adsorbent supports.

35 Claims, No Drawings

METHOD OF PREPARING SILICATE COMPOSITION

BACKGROUND OF THE INVENTION

The present invention is directed toward an improved method for manufacturing silicate compositions. More particularly, the described inventive technique is adaptable for utilization in catalytic and/or adsorbent support manufacturing.

Various types of catalytic compositions have found widespread utilization throughout the chemical, petroleum and petrochemical industries for effecting numerous conversions of reactants to more valuable products. Additionally, numerous adsorbents have been found to have a wide application in separation processes and/or purification processes. Typically, such catalytic compositions comprise heterogeneous catalysts. The heterogeneous catalyst consists of catalytic components typically supported on a catalyst base. This catalyst base or support may be inert or it may contribute to the overall catalytic reaction. Typical of the adsorbents having commercial application are the so-called molecular sieves. Many types of molecular sieves are known. Some molecular sieves comprise highly crystalline silicates comprising, for example, the zeolites. Molecular sieves generally have the peculiar property of preferentially adsorbing certain components from mixtures thus allowing them to be used in numerous separation processes. It should also be pointed out that certain molecular sieves may have catalytic properties and, therefore, may be used as heterogeneous catalysts. Irrespective of whether the molecular sieves are utilized as adsorbents or catalysts it has become the common practice to bind the molecular sieves within a support matrix thereby giving the adsorbent or catalytic composition desired properties like added increased strength, heat transfer capabilities, etc.

Typical of the compositions finding wide application as supports and/or binders is silica. Silica or silica-alumina have been widely used in the petroleum and petrochemical industries as catalyst supports and molecular sieve binders. Silica or silica-containing supports have been utilized in catalytic reforming, fluidized catalytic cracking, hydrocracking, and dehydrogenation processes. Moreover, silica or silica-containing binders have been utilized to bind molecular sieves for numerous separation and catalytic processes including fluidized catalytic cracking, the aromatization of light hydrocarbons, and the separation of the xylene isomers.

Because silica and silica-containing compositions have gained wide use in the chemical processing industries it is advantageous to develop new and simplified procedures for formulating silica-containing supports and molecular sieve binders.

OBJECTS AND EMBODIMENTS

The principal object of our invention is an improved method of preparing silicate-containing compositions. A corollary objective is a method of preparing a silica-containing composition from a silicate-containing sol without the use of a gelling agent. Other objects in applying the invention include a simplified method of preparing a silica-containing composition without the need of acidifying the precursor sol. Accordingly, a broad embodiment of the present invention is directed toward a method of preparing a silica-containing composition comprising the steps of: forming a shaped particle of a lithium silicate sol; heating the particle to a temperature of about 70° C. or more in the absence of a gelling agent while maintaining the shape thereof; and, subjecting the shaped particle to a washing step to remove lithium therefrom.

In an alternative embodiment, the present invention provides a method of preparing a spheroidal silica containing composition comprising the steps of: forming spheroidal particles of lithium silicate sol; raising the temperature of the spheroidal particles to at least about 70° C. by dispersing them into hot oil in the absence of a gelling agent; and, subjecting the spheroidal particles to a washing step to remove lithium therefrom.

In another and more specific embodiment, the present invention comprises a method of preparing a spheroidal silica-containing composition comprising the steps of: preheating lithium silicate sol to a temperature of from about 10° C. to about 75° C.; forming spheroidal particles of the preheated lithium silicate sol; raising the temperature of the spheroidal particles to a temperature of at least about 70° C. by dispersing them into hot oil in the absence of a gelling agent; subjecting the spheroidal particles to an aging step; subjecting the spheroidal particles to a washing step to remove lithium therefrom; subjecting the washed spheroidal particles to a drying step; and, calcining the dried spheroidal particles.

These as well as other objects and embodiments will become evident from the following, more detailed description of the present invention.

INFORMATION DISCLOSURE

The art recognizes numerous methods of preparing silica-containing compositions. For example, U.S. Pat. No. 2,525,135 discloses an apparatus for forming pills or pelleted particles which can be utilized as catalyst supports. It is specifically disclosed in this reference that a silica-containing composition may be formed by this apparatus. It is disclosed that sodium silicate commonly called water glass and an acid such as sulfuric acid are to be admixed to form a sol. The sol is subsequently allowed to set into a firm gel or hydrogel. The firm gel is thereafter formed into pellets by the method of the invention disclosed therein.

U.S. Pat. Nos. 2,385,217 and 2,384,946 disclose further methods of preparing silica-containing compositions. Both references utilize the so-called oil-drop technique to produce spherical silica containing compositions. Both references teach that silica-containing compositions may be obtained by first forming an acidified water glass sol and thereafter allowing the sol to gel in a gelling medium. Both references teach that temperature affects the time of gelation and that an increase in temperature will shorten the time required for the acidified sol to gel. However, the references do not disclose that temperature can be utilized to induce gelation. Rather in these references the gelation is induced by acidification of the water glass sol. Accordingly, both references teach the use of an acid as a gelling agent for a silica-containing sol, not the use of sol temperature to induce gelation. U.S. Pat. No. 2,834,739 in discussing aforementioned U.S. Pat. No. 2,384,946 emphasizes this fact. U.S. Pat. No. 2,834,739 indicates that the temperature of the sol will affect its rate of gelation. However, U.S. Pat. No. 2,834,739 does not indicate that gelation may be induced by temperature control of the sol.

Additionally, a further reference merits consideration. U.S. Pat. No. 3,442,821, at column 2, lines 9–13, appears to mischaracterize the effect of temperature on silica sols. Specifically, this reference indicates that alumina-containing spheres are not as readily prepared by the oil-drop method as are silica spheres which form by thermal setting without the aid of a gelling agent. As indicated heretofore in the references cited above, temperature variation of the sol has been employed to adjust the speed of gelation; however, the aforementioned references do not teach that temperature may be utilized to induce gelation. These references teach the use of pH control to induce gelation. As previously noted, this can be achieved by the acidification of the sol. Once the sol has been acidified, the sol will begin to gel and the temperature of the sol will affect the gelation rate, not its inducement. As will be explained hereinafter in the reference by Iler, lithium silicate sols have a unique property not possessed by other alkali metal silicate sols. Lithium silicate sols are different because they undergo a reversible gelation upon being heated without the necessity of pH adjustment. Moreover, it should be noted that U.S. Pat. No. 3,442,821 fails to disclose that the lithium may be extracted from a lithium silicate gel by a washing step and that a silica-containing composition so produced may be used as a catalyst or adsorbent support.

An alternative method of forming silica-containing compositions is set forth in U.S. Pat. No. 2,645,619. The method disclosed in this reference is the so-called oil-drop method. In the oil-drop method disclosed in U.S. Pat. No. 2,645,619 an alkali metal silicate, hexamethylene tetramine are admixed to form a silica sol. An acid is added to reduce the pH of the sol to about 4 or 5. Thereafter the sol is dispersed in hot oil. As a result of the decomposition of the hexamethylene tetramine the sol slowly sets to a gel. Lithium silicate is disclosed as one possible source for silica in this reference. However, this reference emphasizes that it is important that the hexamethylene tetramine and acid be admixed with the silica source in order for gelation to take place.

U.S. Pat. No. 2,672,452 discloses a variation on the so-called oil-drop method. In this reference it is disclosed that the properties of the suspending medium (hot oil) may be maintained by incorporating from about 0.0001% to about 1% by weight of an aromatic hydroxy compound. This reference further discloses that the silica sol should be synthesized by use of a suitable organic basic compound and may also contain an acid component.

In "The Chemistry of SiO$_2$" by R. K. Iler, John Wiley & Sons, 1979, beginning at page 145 it is disclosed that when a lithium silicate sol is heated to about 80° C. or more it will undergo gelation in the absence of a gelling agent and that the gel will revert to a sol upon cooling to a temperature less than about 80° C. Although it discloses the reversible gelation of a lithium silicate sol by temperature without the use of a gelling agent, the Iler reference does not disclose a washing step to remove lithium from the gel to prevent its reversion to a sol upon cooling to a temperature below about 80° C. Moreover, Iler does not disclose that a silicate so derived would have desirable properties as a catalyst or adsorbent support.

Accordingly, the art relating to the preparation of catalyst support recognizes that the so-called oil-drop method may be utilized to formulate silica-containing compositions of spheroidal form. However, this prior art discloses that certain gelling agents must be added to the silica sol in order to effect gelation of the silica sol to the hard spheres. Additionally, this art has taught that the gelation of the silica sol be effected by the acidification of the sol. Such an acidification of a silica sol requires tedious and cumbersome steps to assure that the sol contains exactly the correct amount of organic base and the correct amount of acid. This acidification of the silica sol also increases the difficulty of incorporating pH sensitive constituents, such as molecular sieves, into the sol when their presence within the finished product is so desired. In the case of molecular sieves low pH's tend to dissolve and destroy the crystalline structure of the molecular sieves. As a result when molecular sieves are admixed with an acidified silica sol they undergo a loss of crystallinity during the preparation of the final silica-containing composition. Accordingly, the method of preparing a silica-containing composition disclosed in these references above have inherent disadvantages.

The Iler reference, while disclosing that lithium silicate sols undergo a phase transformation to a gel from a sol when heated to about 80° C. or more, additionally teaches that this gel will revert to a sol upon cooling. There is no recognition that the gel may be set by a washing step to remove lithium from the gel. Furthermore, there is no recognition or teaching that such a gel which has had the lithium removed by washing is suitable as a catalyst or adsorbent support.

DETAILED DESCRIPTION OF THE INVENTION

To reiterate briefly, the present invention relates to an improved method of preparing a silicate composition, said composition being suitable for use as a catalyst support and/or adsorbent support. Although the major portion of the following discussion relates to the oil-drop method of preparing a silicate composition, there is no intent to so limit the present invention. As will become apparent, any suitable means of forming shaped particles from lithium silicate sols may be utilized in the invention. Accordingly, pelleting, pilling, extrusion, or molding may be utilized in the present invention in addition to the oil-drop method although not necessarily with equivalent results.

As noted above, the art has long recognized that alkali metal silicate sols, particularly sodium silicate (water glass) may be utilized in the preparation of silicate compositions. However, the art has taught that the gelation of the alkali metal silicate sol be effected by use of gelling agents such as acids and/or organic bases. Accordingly, gelation in the prior art has been substantially achieved by means of control of the pH of the alkali metal silicate sol. As previously noted this is a disadvantageous method of effecting gelation.

An essential feature of the present invention is the use of lithium silicate sols as the starting material for preparing silica-containing compositions. The art has recognized that in silica systems the lithium ion acts in a different manner than does the sodium or potassium ion. As noted previously, R. K. Iler discloses in "The Chemistry of SiO$_2$", John Wiley & Sons, 1979, beginning at page 145, that when a lithium silicate sol is heated to 80° C. or more it will gel and upon cooling will revert to a sol. Accordingly, it is possible to gel a lithium silicate sol by temperature without the use of gelling agents thereby overcoming the problems of the prior art.

The lithium silicate sols may have SiO$_2$/Li$_2$O molar ratios of up to about 25. Especially preferred lithium silicates are those having SiO$_2$/Li$_2$O molar ratios of from about 4 to about 8 and may have a pH of from about 10 to about 11. Numerous methods of preparing lithium silicate sols may be employed. For example, lithium hydroxide may be admixed with a solution of polysilicic acid, to a suspension of silica gel, or to a silica sol free from alkali metal or other cations. Alternatively, U.S. Pat. Nos. 2,668,149; 3,180,746; 3,180,747; 3,392,039 and British Pat. Nos. 1,198,313 and 1,263,984 disclose methods for preparing lithium silicate sols.

Regardless of their method of preparation, lithium silicate sols may be advantageously maintained at a temperature from about 10° C. to about 75° C. prior to heating to a temperature of about 70° C. or more. It is preferred that the temperature of the sols be from about 25° C. to about 45° C. prior to heating to a temperature of about 70° C. or more. Maintaining a preheating temperature of about 25° C. to about 45° C. is preferable for lithium silicate sols with $SiO_2/Li_2O$ molar ratios over about 8.

Pursuant to the invention the lithium silicate sol is formed into a shaped particle. The shape of the particle may be any one desired and is typically dictated by the particular application. Accordingly, the shaped particle may be a polyhedron or spheroidal. The desired shape of the particle will typically dictate the exact means of forming the shape. Accordingly, when a polyhedron is desired some form of extrusion may be utilized. Alternatively, a pilling or molding operation may be employed. When the desired shaped particle is spheroidal the so-called oil-drop method may be advantageously utilized.

The oil-drop method is well known in the art. Typically, spheroidal particles of sol are formed as droplets. Typically, these droplets may be formed by passing the sol through suitable orifices or from a rotating disc. The droplets then typically fall into oil which acts as a suspending medium. The diameter of the spheroidal particles may be controlled by adjusting the diameter of the orifices from which the droplets flow and/or the distance that the sol droplets must fall before contacting the suspending medium.

It is to be understood that the term oil as used herein is to be given a broad meaning and includes any of the substances commonly employed as suspending mediums in the oil-dropping process. Accordingly, any suitable suspending medium may be utilized in the manufacture of silica from lithium silicate. Preferred suspending mediums include Nujol, kerosene, selected fractions of gas oil, etc. It generally is preferred to utilize an oil having a density less than that of the lithium silicate sol so that the sol may be dropped into the oil. However, it should be understood that the oil may have a density higher than that of the lithium silicate sol. In such a case the lithium silicate spheroidal particles would be introduced at the bottom of a confined body of oil. Thus the spheroidal particles would rise slowly to the surface of the oil setting into firm gels as they are heated to a temperature of about 70° C. or more during passage therethrough.

Irrespective of the desired shape of the lithium silicate sol particle and method of forming the shape it is essential to the invention that the particle once formed be heated to a temperature of about 70° C. or more and preferably to a temperature of about 80° C. or more. Moreover, this is done while maintaining the shape of the particle. As set forth above by heating the lithium silicate sol particle to a temperature of about 70° C. or more the lithium silicate sol undergoes a phase transformation to a gel. The gelation of a lithium silicate sol is achieved merely by heating the particle to a temperature of about 70° C. or more and it is unnecessary to adjust the pH thereof. Accordingly, it is a further feature of this invention that the lithium silicate particle be heated to a temperature of about 70° C. or more in the absence of a gelling agent. As a result of this feature of the invention it is unnecessary to control the pH of the gel thereby accruing the benefits heretofore mentioned.

While the lithium silicate sol particle is undergoing gelation by heating it is, of course, necessary to maintain the shape thereof. The exact method of maintaining the shape of the particle is, of course, dictated by the method of forming the particle. Accordingly, if the particle is being formed by molding, the particles may be heated while within their mold. Alternatively, when using the oil-drop method the spheroidal shape of the particle is maintained while the particle drops through the suspending medium. Irrespective of the exact method employed once a lithium silicate sol has fully gelled the particle shape will be self-supporting.

Following gelation of the lithium silicate sol particle, it is an essential feature of the invention that the particles be washed to remove lithium therefrom. As previously indicated such a step is not taught in the aforementioned Iler reference. If the lithium is not so removed, the gelled lithium silicate will eventually revert back to a sol upon cooling to a temperature below about 70° C. The washing of the lithium silicate particles may be achieved by any suitable means such as water or an aqueous salt solution. Typical of appropriate wash solutions is ammonium nitrate or ammonium chloride. The washing step may be effected at any suitable temperature. Because the gelled lithium silicate takes some time to revert back to a sol the washing step may take place at a temperature below about 70° C. However, it is preferable that the washing take place at a temperature of about 70° C. or more and it is especially preferred that the washing take place at a temperature of 80° C. or more.

In order to improve the properties of the silicate compositions produced by the method of the invention, it is within the scope of the present invention that the particles be subjected to an aging step. The aging step is effected by storing the particles for a period of time in an aging medium. Any suitable aging medium may be employed. For example, the aging medium may comprise water or alternatively it may comprise oil. If oil-dropping is employed to prepare the particles the aging medium may be the same oil utilized as the suspending medium. The time period of the aging step may be any time sufficient to impart the desired improved properties to the particles and may vary, for instance, from as short as 30 minutes to as long as 72 hours. The particles may be aged at any suitable temperature. For example, temperatures which may be employed during aging may vary from ambient to 100° C. or more. Additionally, the particles and aging medium may be subjected to pressure. The pressures utilized will vary depending on the particular temperature employed and will be that pressure required to prevent vaporization of the constituents such as water, within the aging environment, or particles or aging medium. The aging step may be effected prior to or subsequent to the washing step. Moreover, because the aging may be performed in an aging medium comprising water, a salt solution may be utilized and hence, if desired, the washing step may act as an aging step.

Irrespective of the use of an aging step or its sequence in the method of the invention the particles may be subjected to a drying step. Any suitable drying step typically employed in the art may be utilized in the present invention. A typical drying temperature would be 95° C. and a typical time of drying would be about 2 hours.

In addition to subjecting the particle to a drying step it is contemplated within the scope of the present invention that the particles be subjected to a calcination step. The calcination step is utilized to drive from the particles any remaining volatile matter including oil which may remain on the particles after drying. A broad range of calcination conditions are known and any such suitable conditions may be employed in the present invention. Typical calcining conditions would include maintaining the particles at a temperature of about 550° C. for a period of 2 hours under a stream of air.

As noted previously, the present invention is utilized in the preparation of silica compositions which are suitable as catalyst supports and/or adsorbent supports. Pursuant to this end it is often advantageous to incorporate other constituents within the silica composition prior to the preparation of the final support. Accordingly, it is within the scope of the present invention to incorporate other metal oxides within the silica composition so that the finished support may possess desired properties. Therefore, the invention may be further characterized in that the shaped particle of lithium silicate has dispersed therein an alumina source. Typical of the alumina sources would be gibbsite, boehmite, diaspore and/or any alumina which would result from a thermally or hydrothermally induced transformation of these. Alternatively, metallic aluminum may be treated to produce alumina and the treated alumina may thereafter be admixed with the lithium silicate sol. Accordingly then, it is contemplated within the scope of the present invention that an alumina source be incorporated into the lithium silicate sol with the resulting silica composition comprising a silica-alumina support. Such silica-alumina supports have wide utility in the art of catalysis.

As noted previously, silica compositions are utilized as support matrices for molecular sieves. Accordingly, it is within the scope of the present invention that the shaped particles have dispersed therein a molecular sieve. The desired molecular sieve would be admixed with the lithium silicate sol. The resulting silica composition containing molecular sieves may then be utilized as a catalyst and/or an adsorbent. Because the present invention utilizes a temperature induced gelation of the lithium silicate sol, molecular sieves which are incorporated therein will not undergo a pH induced attrition, the pH of the lithium silicate sols being compatible with the molecular sieves. Any suitable molecular sieve known in the art may be utilized in the present invention. Typical of the molecular sieves which may be employed are both synthetic and naturally occurring zeolites including X-zeolites, Y-zeolites, L-zeolites, mordenites, ZSM-type zeolites, A-zeolites, ZK-4-zeolites, B-zeolites, E-zeolites, F-zeolites, HJ-zeolites, M-zeolites, Q-zeolites, T-zeolites, W-zeolites, alpha-zeolites, beta-zeolites, and omega-zeolites. Additionally, molecular sieves comprising crystalline silicates such as silicalite-type molecular sieves may be utilized or crystalline alumino phosphates may be used.

Although a molecular sieve may be incorporated into the lithium silicate sol to provide a final molecular sieve containing silicate support, it is further contemplated within the scope of this invention that the molecular sieves may be synthesized during gelation and aging of the lithium silicate sol. It is, therefore, a further embodiment of the present invention that the shaped particles formed of the lithium silicate sol have dispersed therein a molecular sieve template and an alumina source if it is desired that the final synthesized molecular sieve contains alumina. Such templates are well known in the art and comprise compounds which have structure-directing effect. By structure-directing effect it is meant that the presence of these compounds aids in orienting the reacting species to form the appropriate molecular sieve crystal structure. Any molecular sieve template known in the art may be utilized in the present invention. For example, ZSM-8, ZSM-5, and ZSM-11 zeolites may be obtained by using tetraethylammonium, tetrapropylammonium, and tetrabutylammonium bromide, respectively, as molecular sieve templates. By incorporating the molecular sieve templates and a source of alumina, if required, into a lithium silicate sol it is possible to synthesize the desired molecular sieves during gelation. It is, therefore, unnecessary to incorporate molecular sieves in the lithium silicate sol prior to gelation.

In order to more fully disclose the invention the following examples are introduced. However, it is emphasized that said examples are only intended as illustrative of specific embodiments and are not intended to limit the broad scope of the present invention.

EXAMPLE I

In this example 500 grams of lithium silicate sol having a $SiO_2/Li_2O$ molar ratio of about 6 and a pH of about 10.5 were preheated to a temperature of 50° C. Spheroidal particles of the sol were formed and dropped into hot oil. The temperature of the spheroidal particles was raised to 100° C. by contact with the hot oil.

The heated spheroidal particles were collected and stored in hot oil at about 95° C. for 20 hours. After the 20 hour period the spheroidal particles were washed for 2 hours to remove lithium. In this instance $NH_4NO_3$ was used as the washing solution. The washing took place at a temperature of 95° C. for 1 hour. The spheroidal particles were thereafter calcined for 2 hours at 550° C. These spheroidal particles were designated Support A and their properties are set forth in Table I.

EXAMPLE II

In this example the procedure which was followed was identical to that which is set out in Example I, however, in this instance the washing was effected with a solution of $NH_4Cl$. The spheroidal particles recovered were designated Support B and the properties of Support B are set out in Table I.

EXAMPLE III

As in the previous examples, 500 grams of the lithium silicate sol were preheated to 50° C. When this temperature was reached, spheroidal particles were formed and were dropped into hot oil to raise their temperature to 100° C. The spheroidal particles were thereafter collected and stored in an autoclave at a temperature of 140° C. and a pressure of 80 psig for 2 hours. After the 2 hour period, the spheroidal particles were washed, dried, and calcined as set out in Example I. The resulting spheroidal particles were designated Support C. The properties of Support C are set out in Table I.

EXAMPLE IV

The procedure followed in Example IV was the same procedure set forth in Example III. However, in Example IV the washing step was effected with a solution of NH4Cl. The spheroidal particles recovered were designated Support D. The properties of Support D are set out in Table I.

EXAMPLE V

In this example, 500 grams of the lithium silicate sol were preheated to 50° C. Spheroidal particles of the sol were formed and dropped into hot oil in order to heat them to 100° C. They were thereafter collected and stored in an aqueous 0.5 wt. % NH4NO3 solution for 20 hours at a temperature of 95° C. After the 20 hour period the spheroidal particles were dried and calcined as described in Example I. The spheroidal particles were collected and designated Support E. The properties of Support E are set forth in Table I.

EXAMPLE VI

The procedure followed in Example VI is the same procedure set forth in Example V. However, in Example V the spheroidal particles were removed from the hot oil and were stored in an aqueous solution of NH4Cl for a period of 20 hours at 95° C. As in Example V, the recovered spheroidal particles were then dried and calcined as before. These spheroidal particles were then designated Support F. The properties of Support F are set out in Table I.

TABLE I

Oil-Dropping of Lithium Silicate Sols

| Support | ABD[1] | SA[2] | PV_1[3] | PV_2[4] | PD[5] | % wt. Li[6] |
|---------|--------|-------|---------|---------|-------|-------------|
| A | 0.36 | 139 | 0.41 | 0.0709 | 282 | 0.064 |
| B | 0.36 | 136 | 0.49 | 0.0861 | 291 | 0.056 |
| C | 0.44 | 54 | 0.13 | 0.8569 | 702 | 0.105 |
| D | 0.41 | 61 | 0.13 | 0.8517 | 667 | 0.065 |
| E | 0.38 | 294 | 1.22 | 0.0612 | 105 | 0.074 |
| F | 0.38 | 309 | 1.23 | 0.0694 | 102 | 0.076 |

[1] apparent bulk density (g/cc)
[2] surface area (m$^2$/g)
[3] pore volume (cc/g): <600 Å diameter pores
[4] pore volume (cc/g): >600 Å diameter pores
[5] median pore diameter (Å)
[6] on the calcined base A review of the support properties in Table I clearly discloses the advantages to be derived by the invention. By means of the invention it was possible to formulate spherical silicate compositions suitable as catalyst supports. The apparent bulk densities, surface areas, pore volumes, and pore distributions of Supports A to F all demonstrate the suitability of these supports as catalyst bases. Accordingly, it can be seen by means of the present invention that suitable catalyst supports may be made without the necessity of adjusting the pH of the support precursor sol thereby allowing simplified means of manufacturing silica-containing catalyst and adsorbent sup- ports.

What is claimed is:

1. A method of preparing a silica-containing composition comprising the steps of:
   (a) forming a shaped particle of a lithium silicate sol;
   (b) heating the particle to a temperature of about 70° C. or more in the absence of a gelling agent to form a gel while maintaining the shape thereof; and,
   (c) subjecting the shaped particle to a washing step prior to cooling of said gel to a temperature of less than 70° C. to remove lithium therefrom and thereby prevent reversion of said gel to said sol.

2. The method of claim 1 further characterized in that the lithium silicate sol has a molar ratio of $SiO_2/Li_2O$ of up to about 25.

3. The method of claim 1 further characterized in that the lithium silicate sol is maintained at a temperature of from about 10° C. to about 50° C. prior to heating to a temperature of about 70° C. or more.

4. The method of claim 1 further characterized in that the shaped particle is a spheroid.

5. The method of claim 1 further characterized in that the shaped particle is a polyhedron.

6. The method of claim 1 further characterized in that the shape of the particle is maintained by dispersing the particle in oil.

7. The method of claim 1 further characterized in that the shaped particle is formed by extrusion.

8. The method of claim 1 further characterized in that the lithium silicate sol has dispersed therein an alumina source.

9. The method of claim 1 further characterized in that the lithium silicate sol has dispersed therein a molecular sieve.

10. The method of claim 1 further characterized in that the lithium silicate sol has dispersed therein a molecular sieve template.

11. The method of claim 1 further characterized in that the shaped particle is subjected to an aging step prior to washing.

12. The method of claim 1 further characterized in that the shaped particle is subjected to a drying step after washing.

13. The method of claim 1 further characterized in that the shaped particle is subjected to a calcination step after washing.

14. The method of claim 1 further characterized in that the particle is heated to a temperature of about 80° C. or more while maintaining the shape thereof.

15. The method of claim 2 further characterized in that the lithium silicate sol has a molar ratio of $SiO_2/Li_2O$ of from about 4 to about 8.

16. A method of preparing a spheroidal silica-containing composition comprising the steps of:
   (a) forming spheroidal particles of lithium silicate sol;
   (b) raising the temperature of the spheroidal particles to at least about 70° C. by dispersing them into hot oil in the absence of a gelling agent to form a gel; and,
   (c) subjecting the spheroidal particles to a washing step prior to cooling of said gel to a temperature of less than 70° C. to remove lithium therefrom and thereby prevent reversion of said gel to said sol.

17. The method of claim 16 further characterized in that the lithium silicate sol has a molar ratio of $SiO_2/Li_2O$ of up to about 25.

18. The method of claim 16 further characterized in that the lithium silicate sol is maintained at a temperature of from about 10° C. to about 50° C. prior to heating to a temperature of about 70° C. or more.

19. The method of claim 16 further characterized in that the spheroidal particles of lithium silicate sol have dispersed therein an alumina source.

20. The method of claim 16 further characterized in that the spheroidal particles of lithium silicate sol have dispersed therein a molecular sieve.

21. The method of claim 16 further characterized in that the spheroidal particles of lithium silicate sol has dispersed therein a molecular sieve template.

22. The method of claim 16 further characterized in that the spheroidal particles are subjected to an aging step prior to washing.

23. The method of claim 16 further characterized in that the spheroidal particles are subjected to a drying step after washing.

24. The method of claim 16 further characterized in that the spheroidal particles are subjected to a calcination step after washing.

25. The method of claim 16 further characterized in that the spheroidal particles are heated to a temperature of about 80° C. or more while maintaining the shape thereof.

26. The method of claim 25 further characterized in that the spheroidal particles are heated to a temperature of about 100° C.

27. A method or preparing a spheroidal silica-containing composition comprising the steps of:
   (a) preheating lithium silicate sol to a temperature of from about 10° C. to about 50° C.;
   (b) forming spheroidal particles of the preheated lithium silicate sol;
   (c) raising the temperature of the spheroidal particles to a temperature of at least 70° C. by dispersing them into hot oil in the absence of a gelling agent to form a gel;
   (d) subjecting the spheroidal particles to an aging step;
   (e) subjecting the spheroidal particles to a washing step prior to cooling of said gel to a temperature of less than 70° C. to remove lithium therefrom and thereby prevent reversion of said gel to said sol;
   (f) subjecting the washed spheroidal particles to a drying step; and,
   (g) calcining the dried spheroidal particles.

28. The method of claim 27 further characterized in that the lithium silicate sol has a molar ratio of $SiO_2/Li_2O$ of up to about 25.

29. The method of claim 27 further characterized in that the lithium silicate sol is preheated to a temperature of from about 25° C. to about 45° C.

30. The method of claim 27 further characterized in that the lithium silicate sol has dispersed therein an alumina source.

31. The method of claim 27 further characterized in that the lithium silicate sol has dispersed therein a molecular sieve.

32. The method of claim 27 further characterized in that the lithium silicate sol has dispersed therein a molecular sieve template.

33. The method of claim 27 further characterized in that the washing step comprises contacting the spheroidal particles with water.

34. The method of claim 27 further characterized in that the washing step comprises contacting the spheroidal particles with an aqueous salt solution.

35. The method of claim 27 further characterized in that the calcining is effected at a temperature of about 300° C. or more.

* * * * *